Dec. 3, 1929.　　　VAN DYKE HILL　　　1,738,053
PHOTOGRAPHIC APPARATUS
Filed June 7, 1929　　　4 Sheets-Sheet 1

Fig. 1.

INVENTOR.
VAN DYKE HILL
BY
ATTORNEYS.

Patented Dec. 3, 1929

1,738,053

UNITED STATES PATENT OFFICE

VAN DYKE HILL, OF SCARSDALE, NEW YORK

PHOTOGRAPHIC APPARATUS

Application filed June 7, 1929. Serial No. 369,173.

This invention relates to photographic apparatus, and more particularly to motion picture projectors.

All motion picture projectors in commercial use, so far as I am aware, utilize a continuous ribbon or strip of celluloid film. Such film undergoes considerable abrasion, scratching, and wear in being run through the projector, and frequently is broken. These difficulties become particularly marked in the case of continuously operated or advertising projectors, for in such projectors the picture displayed seldom exceeds five minutes in duration, and therefore in the course of a few days is run through the projector a great many times oftener than a theatrical film is exhibited during its entire useful life. Furthermore, in the event of film breakage there is no operator immediately available to repair the broken film, as there is in theatres, and consequently the advertising projector must be shut down.

The primary object of my invention is to overcome the foregoing difficulties and to prevent wear and or breakage of a motion picture film, which I do by dividing the film into sections, and protectively framing each of the film sections the framed sections being fed past a projector in sequential succession. Each of the sections is preferably made a plurality of pictures in length, say 16 pictures, but they may be single pictures.

In one general aspect my invention comprehends a novel type of motion picture film, which consists of a plurality of film sections each mounted in a frame, the sections preferably being a plurality of pictures in length, and the frames preferably being relatively rigid metallic frames, serving to prevent scratching of the film surface and breakage of the film, and being adapted for feed in end to end succession for the reproduction of the motion picture. A further object of my invention is to initially provide a continuous film in which there is sufficient space between successive pictures to permit of the use of a fairly substantial cross bar on the frames, particularly with a standard size film on which the successive exposures are spaced by the standard amount. Further objects of my invention, considered in this aspect, are the provision of a suitable frame, the provision of a suitable method for loading the film sections into the frame, and more especially for bringing the pictures thereon into registry with the apertures of the frame, while allowing for and preferably controlling the shrinkage and/or stretch of the film due to humidity conditions.

In another general aspect my invention comprehends a suitable motion picture projector for the projection of my novel film. Such a projector preferably comprises a supply magazine for a stack of the framed film sections, projection means, and means to intermittently feed the film sections across the projection means in sequential succession at motion picture speed. In order to make continuous operation possible when such operation is desired I provide additional means to return the film sections to the supply magazine, preferably comprising an exhaust magazine for also holding a stack of framed film sections, and conveyor means for transferring said sections from the opposite end of the exhaust magazine back to the opposite end of the supply magazine.

The intermittent feed from the supply to the exhaust magazine is obtained by a reciprocable feeding claw. One of the objects of my invention is to insure operative engagement of the feeding claw with the claw apertures or recesses on the frames, and to this end I provide a magnet for attracting the frames toward the claw. This attraction also helps overcome the inertia of the slides during the dwell periods thereof.

To the accomplishment of the foregoing and many other objects which will hereinafter appear, my invention consists in the novel film elements, the projector therefor, and their relation one to the other, as hereinafter are more particularly described in the specification and sought to be defined in the claims. The specification is accompanied by drawings in which:

Figure 1:
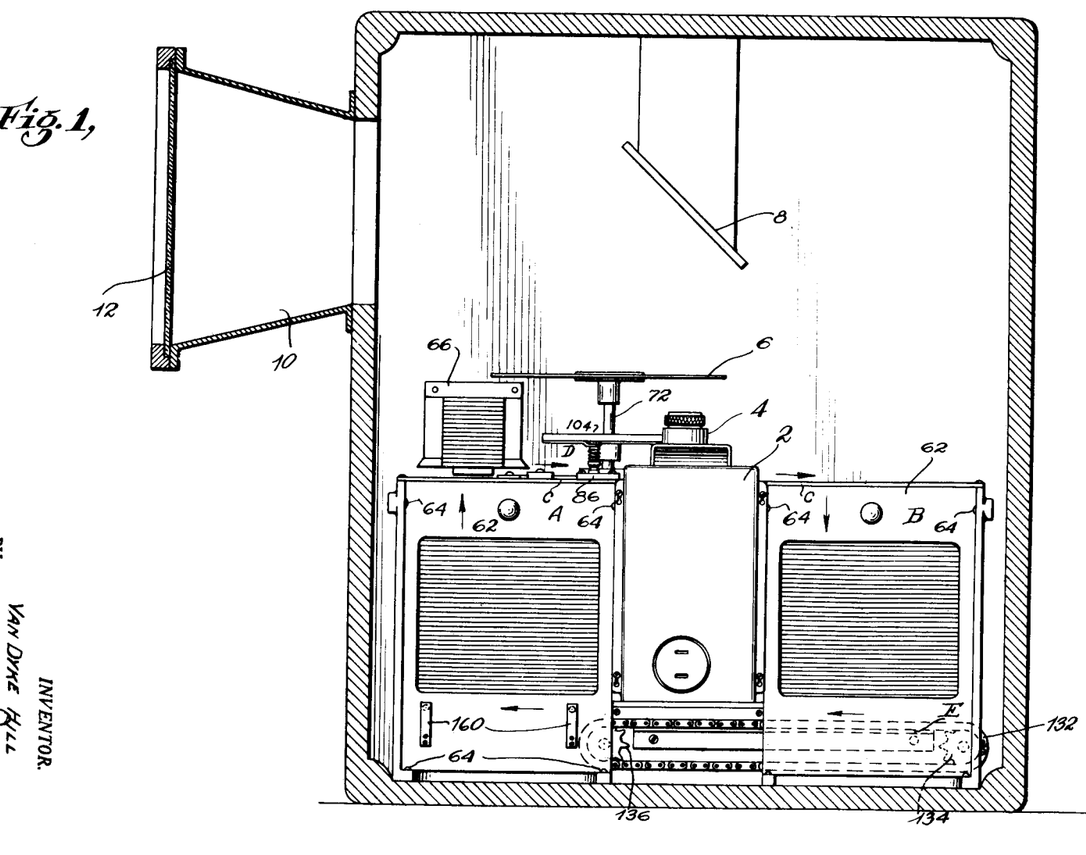
Fig. 1 is a sectional elevation through a projector embodying my invention.
Figures 2, 3:
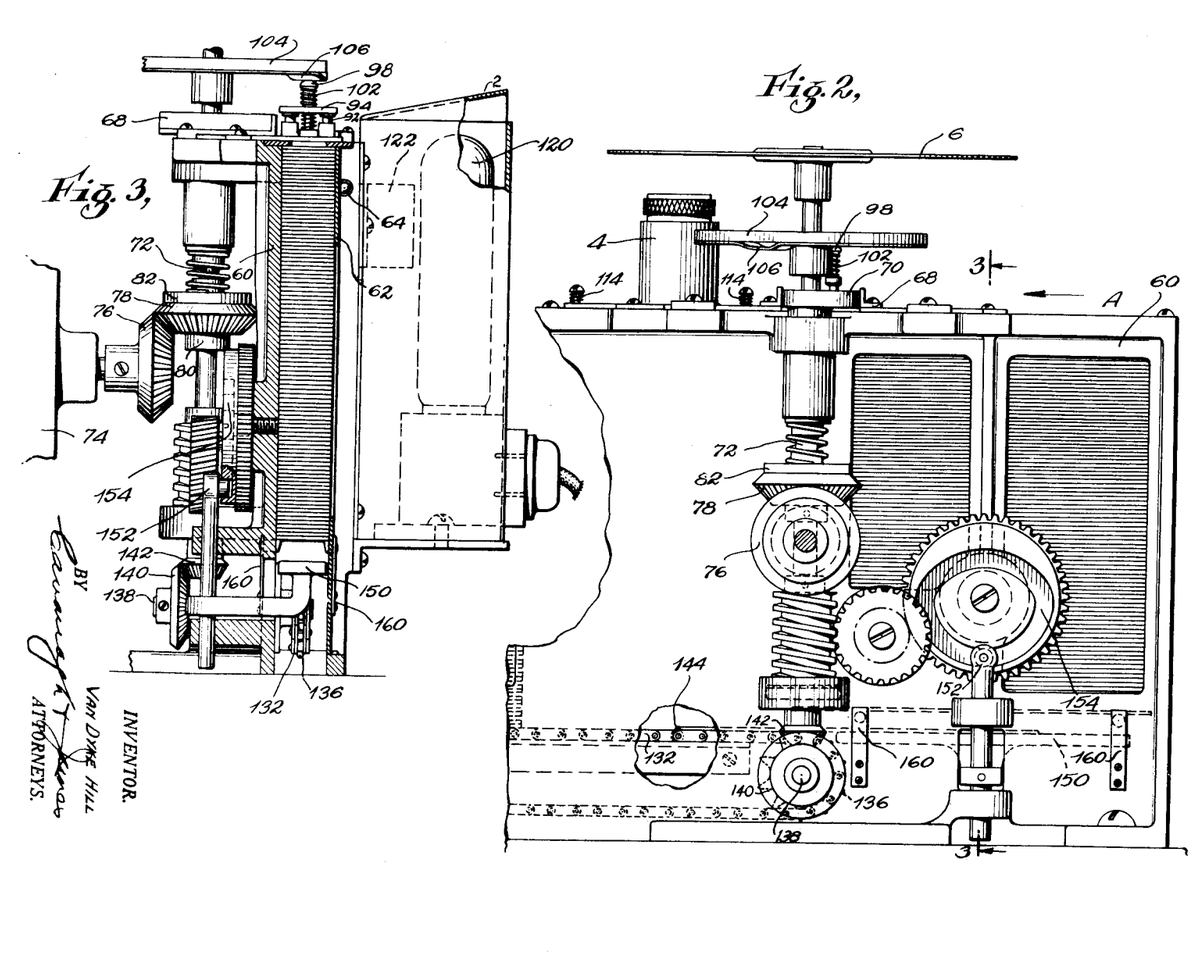
Fig. 2 is a detailed elevation looking at the opposite side of the mechanism of the projector.
Fig. 3 is a section taken in the plane of the line 3—3 in Fig. 2.
Figure 4:
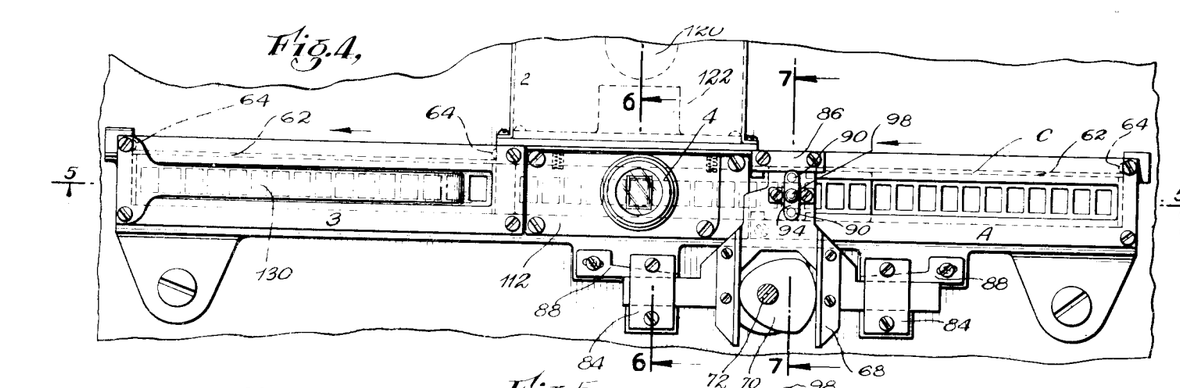
Fig. 4 is a partially sectioned plan view of the mechanism of the projector.

In order to obviate the difficulties arising because of the abrasion and wear on the surface of motion picture films, and the frequent breakage thereof, my invention includes the provision of a novel type of motion picture film consisting of film sections each of which is protectively framed in a relatively rigid and preferably metallic frame. These picture frames are illustrated by and will be described in detail in connection with Figs. 8 through 11 of the drawing, while the method of loading them is illustrated by and will be described in connection with Figs. 12 and 13 of the drawing. One form of projector used for this type of film is illustrated in Fig. 1 of the drawing, and includes a source of light 2, a lens system 4, a shutter 6, a mirror 8, a hood 10, and a screen 12, all of more or less conventional form. The projecting machine additionally includes a supply magazine indicated generally at A, an exhaust magazine indicated generally at B, a horizontal track C extending between the upper ends of the supply and exhaust magazines, claw mechanism D for intermittently feeding the picture frames end to end from the supply magazine through the track to the exhaust magazine, and conveyor means E for conveying the picture frames from the bottom of the exhaust magazine B back to the bottom of the supply magazine A.

Figures 8, 9, 10, 11, 12, 13:
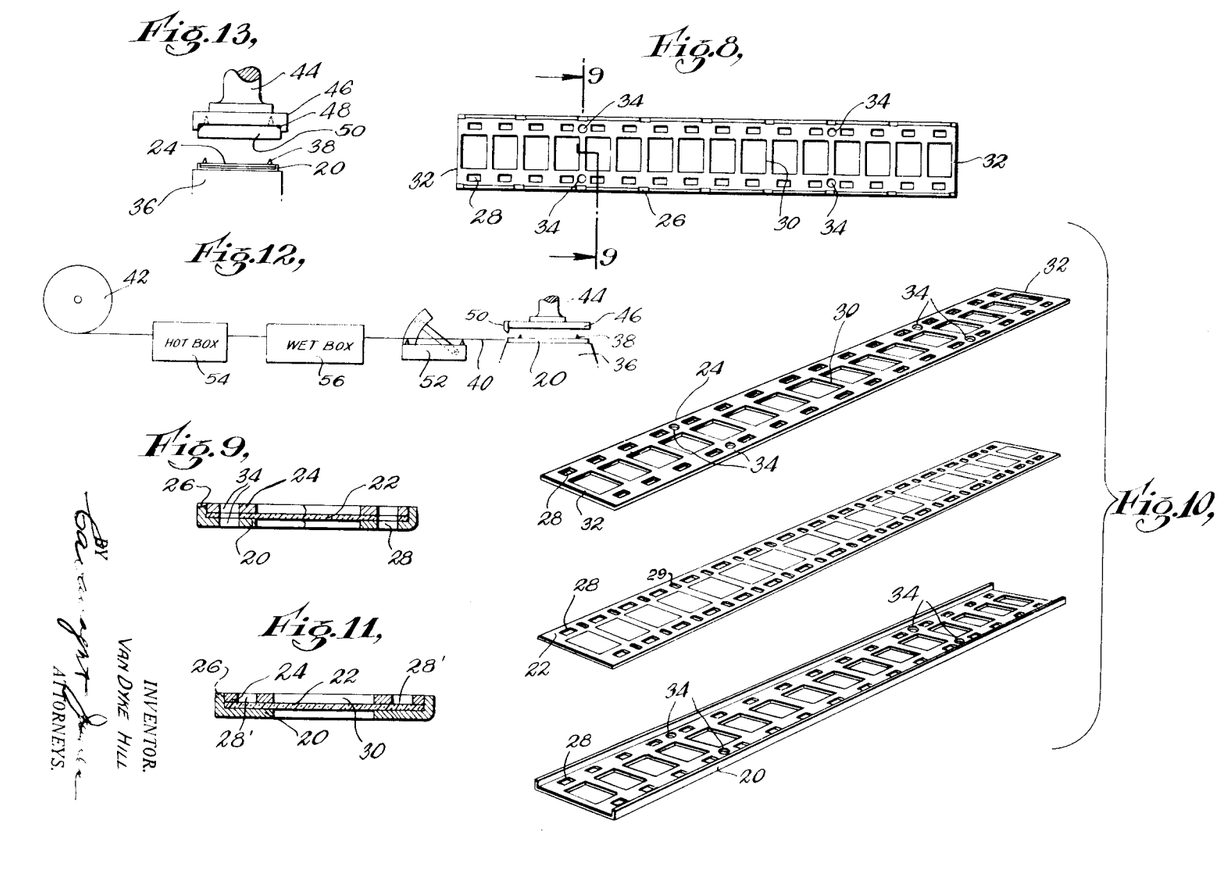
Fig. 8 is a plan view of a frame or slide for supporting a section of motion picture film.
Fig. 9 is a section taken in the plane of the line 9—9 in Fig. 8.
Fig. 10 shows a film frame in disassembled relationship.
Fig. 11 is a section, similar to that shown in Fig. 9, through an alternative frame or slide.
Fig. 12 is a schematic showing of the method of loading the frames with film.
Fig. 13 is an end elevation of an assembling press utilized in the loading method.

Referring now to Figs. 8, 9, and 10 of the drawing, it will be observed that each of the frames for the film sections consists of a ladder-like metallic strip of channelled cross section, 20, for receiving the film section 22, and a second ladder-like metallic strip 24 of flat cross section, which is adapted to be laid against the other side of the film 22 within the channel walls of the strip 20. The frame members are suitably pressed together, and preferably the channel walls of the bottom member 20 are nicked over upon the top member 24, as at 26, in order to anchor the two ladder-like frame members together and to the film held therebetween.

The frame is provided with spaced apertures, notches, or recesses 28 for engagement by a feeding claw. These apertures need not be, but preferably are, located at the center lines of the pictures, rather than at the center lines of the frame lines between the pictures, as is the case with the standard sprocket holes in, say, a 16 mm. film, such as is commonly used in this type of projector. The opened view in Fig. 10 illustrates the film 22 as being provided with claw apertures 28, which, however, may be made in the film sections after they have been fixed within the frames. The regular sprocket holes are numbered 29.

By the use of an improvement subsequently to be described, involving magnetic attraction of the frames against the feeding claw of the projector, it is possible to use a very shallow claw recess or indentation, rather than an aperture extending entirely through the frame, as in Figs. 9 and 10. In such case I provide a frame in which only the top member 24 is perforated with feeding apertures, such an arrangement being illustrated in Fig. 11, having the resulting recesses 28', this figure being in other respects similar to the section shown in Fig. 9. This dispenses with the necessity of perforating the lower frame member 20, and the film 22.

In order to form a sturdy protective frame which will hold the film in a secure and non-warping manner, and preferably with sufficient gripping pressure distributed along the film to prevent shrinkage or stretch thereof, I find it desirable to employ fairly substantial cross bars 30. For example, in a 16 mm. film frame I make these cross bars $\frac{1}{16}$ of an inch in width. One problem which immediately arises is that of maintaining synchronism or uniform spacing of the pictures on the slides when the slides are fed end to end past the projector. To solve this the end cross bars 32 of the frames are reduced in width, the most simple solution being to make them each equal to one-half the width of the intermediate cross bars 30, or, in the particular case already mentioned, to make them $\frac{1}{32}$ of an inch in width.

Another problem met with is to provide sufficient space between successive pictures on the film to accommodate the cross bars. The usual frame line between pictures is practically negligible in width, being either zero or at most merely a few thousandths of an inch wide. One manner in which I have solved this problem consists in utilizing cross bars having a width equal to the height of the pictures, thereby exposing only alternate pictures to view, at a speed of say 8 per second. The presentation of such a film is not quite as good in quality as might be desired, owing to the reduced picture speed and reduced picture continuity. To restore the quality of presentation it is feasible to take the pictures originally at double speed, and then to use alternate pictures at a speed of say 16 per second in order to obtain proper continuity. However, this method has the disadvantage that only specially produced films may be satisfactorily employed, and it is highly desirable to be able to reproduce for advertising purposes parts of standard motion picture films.

For the foregoing reasons I prefer to employ the type of frame shown in Figs. 8 through 11, and in such case in order to provide the necessary space between successive pictures on the film I reduce the size of the exposures printed on the film without reducing the spacing between the successive exposures. In this manner I may use the usual size positive film, say 16 mm., and print this from a standard size negative film, say 35 mm., or from a 16 mm. film, while spacing the successive exposures on the positive film by the regulation distance. This procedure incidentally reduces the width as well as the height of the individual pictures on the film, but no particular disadvantage results from this other than a slight reduction in the size of the ultimate image on the screen and even this presupposes that no change is made in the projector lens system, for if that is suitably altered the full size image may be restored. If the standard lens system is retained it is merely necessary to use a slightly smaller hood and screen, or the border of the original screen may be masked.

Not only must the metallic frames mate up properly in end to end relation to form a perfectly uniformly spaced series of picture apertures, but also the pictures on the film must be brought into exact registry with the apertures in the frames. To facilitate loading the frames with film while obtaining the desired accurate registry I have devised the following method.

The upper and lower frame members 20 and 24 are provided with pilot holes 34. These pilot holes are preferably located intermediate the ends of the frame, as shown, in order to distribute any slight error in registry due to film shrinkage, and are positioned between pictures, so that they are in alignment with the regulation sprocket holes in the film. In loading the frame the lower frame member 20 is laid on a suitable jig or fixture 36, shown in Figs. 12 and 13, which is provided with four dowel pins or pilots 38. These project through the pilot holes 34, and thereby locate the frame member in position. One end of the film 40 is unreeled from a reel 42 and placed in the frame member 20, the desired registry being secured by the fit of the pilots 38 within the appropriate sprocket holes of the film 40. The upper frame member 24 is then laid over the film, it too being brought into registry by the pilots 38, whereupon the press 44 may be actuated, the die 46 serving to clamp the frame members tightly together and to the film held therebetween. The die 46 is preferably provided with shoulders 48 adapted to form the anchoring nicks in the channel walls of the lower frame member 20 which overlap and bind the upper frame member 24.

In accordance with another feature of my invention, the film 40 is cut off into film sections of the proper length, each flush with the ends of the frame, by a cutting means 50 which operates simultaneously with the die 46. This step of cutting the film after it is loaded incidentally insures that the film sections will be framed in proper sequence.

In spite of all of the foregoing precautions the picture finally projected on the screen may waver or wobble up and down, as though there were imperfect continuity between the successive slides. This I have found is due to the fact that film undergoes considerable shrinkage or stretch, depending on humidity conditions, so that the registration of the pictures from one end to the other end of each frame may vary, depending on the shrinkage of the film at the time it is loaded into the frame. To minimize this error I distribute the pilot holes intermediately and symmetrically in the manner already described.

To obviate it altogether I employ either drying, as by heating, or humidification, or, if desired, a suitable quantitative combination of both, in order to control the shrinkage or stretch of the film at the time it is being loaded into the frames. The frames are designed and made of predetermined dimension, which may include an allowance of say 80 thousandths of an inch per foot for shrinkage. The shrinkage which the film actually possesses at the time it is to be loaded may be measured on a sensitive indicator, schematically shown at 52 in Fig. 12, and, if the shrinkage is not correct, it may be altered by making operative either a hot box 54, or a wet box 56, or even a proper quantitative combination of both at once might be employed. The hot box 54 is simply a means for heating the film, increased dryness serving to increase the shrinkage and decrease the length of the film. The wet box 56 is merely a means for subjecting the film to moisture for humidity control, increased humidity serving to increase the stretch and increase the length of the film. When these have been adjusted to obtain the desired predetermined film dimension, so that the film will exactly fit the frames, the film is loaded into and securely clamped by the frames. At occasional intervals the film may be tested by the indicator 52 in order to check the film dimension to see if it still is of the proper amount.

While many features of my invention are applicable to single picture frames it will be appreciated that there is considerable advantage in making each of the frames a plurality of pictures long, for this enhances the smoothness of operation and the continuity of picture presentation. It also permits of a more rigid frame, the cross bars being double the width that they would be in equivalent sized single picture frames. It is far easier to load the frames with film, and fewer operations are required for so doing. The resulting frames and stacks of frames are easier to handle. Furthermore, the magazines for holding the stacks of frames are made more compact in size. In the present case, for example, there being 16 pictures in each frame the frames are used at the rate of one per second, 240 frames being required for a picture of four minutes duration. Obviously, with single picture frames the stacks of frames would have to be 16 times as high, and undoubtedly would prove to be at least very inconvenient to house, to handle, and so on.

The projector is described with reference to Figs. 1 through 7 of the drawings. It includes a supply magazine A, an exhaust magazine B, a track or guide C extending therebetween, claw feeding mechanism D for intermittently feeding the frames from the supply magazine A through the track C to the exhaust magazine B, and conveyor means E for returning the frames from the exhaust magazine B to the supply magazine A.

Considering the circuit of the picture frames more in detail, the frames are stacked vertically, the individual frames being in horizontally superposed relation, and confined and guided between a main casting wall 60 and a cover plate 62, the latter being closed against the frames and held in position by friction catches 64.

The topmost frames in the supply magazine A are attracted upwardly by an electro-magnet 66, which draws the frames into secure contact with the top rail or guide of the track C, and therefore into certain and operative engagement with the feeding claw, regardless of any variations in the thickness of the slides, due to wear, bending, warping, and the like, the cumulative effect of which might considerably alter the total height of the stack of picture frames.

The feeding mechanism D consists of a horizontally reciprocable shuttle 68, which is reciprocated by a cam 70 mounted on a vertical cam shaft 72. The cam shaft 72 is driven by an electric motor 74 through miter gears 76 and 78, the latter being mounted between leather washers for frictional engagement with the fixed collar 80 and the reciprocable spring pressed collar 82, this frictional drive being a safety feature to prevent injury to the machine should some part thereof jam. The shuttle 68 reciprocates in bearings 84 and 86, the wear of which may be taken up by adjustable wedges 88.

The cam 70 is of the quick motion type, being designed to advance the shuttle and picture slide during one-third of a revolution, to return the shuttle during another third of a revolution, and to leave it in retracted position during the third third of a revolution. The picture is at rest, or dwells, for two thirds of a revolution.

The shuttle 68 carries a pair of claws 90, which are carried at the ends of vertically reciprocable plungers 92, the latter being joined by a yoke 94, the latter being constantly urged upward by a compression spring 96. A cam follower 98 is reciprocably mounted in a bearing 100 on the shuttle 68, and also is reciprocable in the yoke 94. A heavy spring 102 is positioned between the cam follower 98 and the yoke 94, so that depression of the cam follower correspondingly depresses the yoke 94, and the claws 90. The spring 102 easily dominates the restoring spring 96, and is provided solely as a safety measure, in case through some accident the cam follower 98 should be depressed while the claws 90 are not located directly over the perforations or indentations intended to receive them.

The cam shaft 72, besides carrying the shuttle cam 70, carries also a drunken screw or face cam 104, provided with a depressive portion 106, which brings the claws 90 into operative feeding engagement with the picture frames during the advancing movement of the shuttle 68. During the return movement of the shuttle the claws are retracted from engagement with the picture frames, and consequently there is no tendency to drag the frames back, so that only sufficient frictional or otherwise produced holding pressure need be applied to the frames to overcome their slight inertia and keep them at rest.

Figures 5, 6, 7:
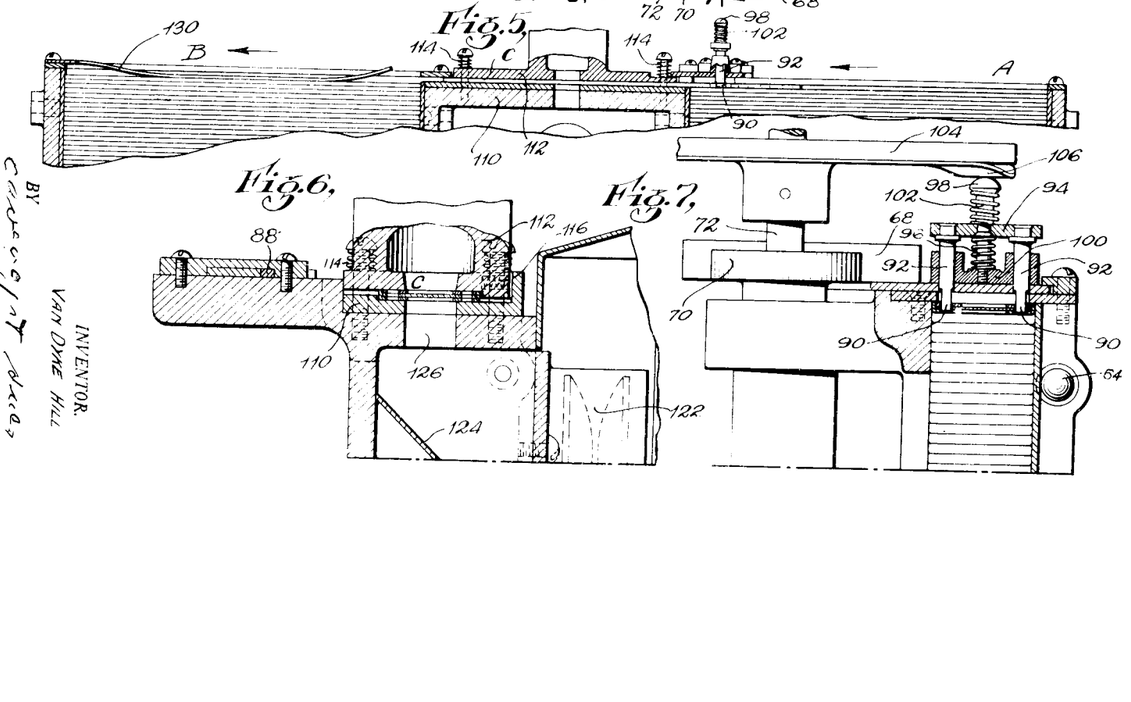
Fig. 5 is a vertical section taken in the plane of the line 5—5 in Fig. 4.
Fig. 6 is a section taken in the plane of the line 6—6 in Fig. 4.
Fig. 7 is a section taken in the plane of the line 7—7 in Fig. 4.

The frames are moved intermittently by the feeding mechanism already described through a track C, in this instance consisting of a lower fixed member 110, and an upper movable member 112 which is resiliently urged toward the member 110 by springs 114. Referring more particularly to Fig. 6, it will be observed that the lower member 110 includes only one fixed shoulder, while the upper or movable member 112 carries the opposite shoulder. These shoulders are urged toward one another by horizontal springs 116, thereby accurately holding the picture frames against movement in a transverse horizontal direction.

During the passage of these slides through the track they are exposed to light projection means consisting of a source of light 120 located within a housing 2, a condenser lens 130 system 122, which focusses the beam of light upon a mirror 124, best shown in Fig. 6, which reflects the beam of light upwardly through an aperture 126 in the guide system, and thence through the picture frame to another lens system 4. The projected light is interrupted in the customary manner by an apertured disc or shutter 6, which is mounted upon and rotated by the vertical cam shaft 72. The picture is finally reflected by a mirror 8 onto a screen 12.

The frames upon leaving the track are pushed one after another into the exhaust magazine, where they are urged downwardly by a leaf spring 130. The exhaust magazine is quite similar to the supply magazine, structurally, in having a detachable plate 62 held in position by friction catches 64. At the bottom of the exhaust magazine the slides rest above a conveyor chain 132, which is carried on an idler sprocket 134 and a driven sprocket 136. The latter is rotated by a shaft 138 to which is fixed a bevel gear 140, driven by a bevel gear 142 mounted on the cam shaft 72. The conveyor chain 132 carries a projection or peg 144, which rides into engagement with the end of the lowermost frame in the exhaust magazine and carries it over toward the supply magazine. In the present instance only one peg is mounted on the conveyor chain, and the gear ratio and the number of sprocket teeth are so selected that a slide is carried from the exhaust to the supply magazine once a second or once in every 16 revolutions of the cam shaft 72.

Beneath the supply magazine A there is a vertically reciprocable elevator 150, which is reciprocated through a cam follower 152 by the positive motion cam 154. The latter is driven through a worm and gear train from the vertical cam shaft 72, the total gear reduction being such as to operate the elevator once in 16 revolutions of the cam shaft 72. While the elevator 150 is in downward position the slide carried by the conveyor chain 132 is moved directly onto the elevator. Thereafter the vertical reciprocation of the elevator takes place, the elevator raising the slide past the holding pawls 160, which retain the stack of slides in elevated position during the descent of the elevator.

From the foregoing description the numerous advantages and the mode of operation of my improved projector will, for the most part, be apparent. The stack of picture slides is divided into two halves, one of which is reversed in sequence. These halves are respectively placed in the magazines A and B, and there held by the cover plates. The machine may then be started, the slides being fed in the manner already explained, so as to obtain a complete circulation thereof, thereby making possible continuous operation. The picture film at no time comes into wearing contact with other surfaces, and therefore is not scratched or worn, while breakage of the already sectionalized film is impossible.

It will be apparent that while I have shown and described my invention in the preferred form, many changes and modifications may be made in the structure disclosed without departing from the spirit of the invention, defined in the following claims.

I claim:

1. In combination, a motion picture projector, a motion picture film comprising detached film sections each a plurality of pictures in length with protective frames for each of said sections, the framed sections forming in end to end relation a continuous motion picture film, and means to feed the sections through the projector in end to end relation, each section being given feeding movements corresponding to the number of pictures therein.

2. In combination, projection means, a motion picture film comprising film sections each a plurality of pictures in length with protective frames for each of said sections, and means to feed the framed film sections in end to end relation across the projecting means in sequential succession at motion picture speed, the feeding movement being equal to the spacing of the pictures to be successively projected.

3. In combination, projection means, a motion picture film comprising film sections each a plurality of pictures in length with relatively rigid metallic frames for each of said sections, the frames forming in end to end relation a continuous motion picture film, and means including a driving motor and a reciprocable feeding means driven thereby for intermittently feeding the framed film sections across the projecting means in sequential succession at motion picture speed, the feeding movement being equal to the spacing of the pictures to be successively projected.

4. A motion picture projecting machine comprising a supply magazine for a supply of framed pictures each a plurality of pictures in length, projection means, means to intermittently feed the framed pictures through the projection means in sequential succession at motion picture speed, the feeding movements corresponding to the number of pictures in the frames, and means to simultaneously return previously projected framed pictures to the supply magazine for continuous operation.

5. A motion picture projecting machine comprising a supply magazine for a supply of framed film sections each a plurality of pictures in length, projection means, means to intermittently feed the film sections through the projection means in sequential succession at motion picture speed, the intermittent feeding movement being equal to the spacing of the successive pictures in each section, and means to return the film sections to the supply magazine for continuous circulation.

6. A motion picture projecting machine comprising a supply magazine for a supply of relatively rigidly framed film sections each a plurality of pictures in length, projection means, means to intermittently feed the film sections in end to end relation through the projection means in sequential succession at motion picture speed, the intermittent feeding movement being equal to the spacing of the successive pictures in each section, and means to return the film sections to the supply magazine for continuous circulation.

7. A motion picture machine comprising a supply magazine for holding framed pictures each a plurality of pictures in length, an exhaust magazine for holding similar framed pictures, a track connecting the supply magazine with the exhaust magazine, projection means traversing the track, means for feeding the pictures from the supply magazine to the exhaust magazine at motion picture speed, the feeding movements corresponding to the number of pictures in the frames, and means for returning the pictures from the exhaust magazine to the supply magazine.

8. A motion picture machine comprising a supply magazine for holding in collateral relation a stack of framed film sections each a plurality of pictures in length, an exhaust magazine for holding a stack of similar framed film sections in collateral relation, a track connecting one end of the supply magazine with one end of the exhaust magazine, projection means traversing the track, means for intermittently feeding the slides in end to end relation from the supply magazine to the exhaust magazine at motion picture speed, the feeding movements corresponding to the number of pictures in the frames, and means for returning the framed sections from the other end of the exhaust magazine to the other end of the supply magazine.

9. A projection machine comprising a supply magazine for holding a plurality of picture slides, each of said slides being a plurality of pictures long, an exhaust magazine for holding a plurality of said picture slides, a track connecting one end of the supply magazine with one end of the exhaust magazine, projection means traversing the track, means including a driving motor and reciprocable feeding means driven thereby for intermittently feeding the slides from the supply magazine to the exhaust magazine, the feeding movement being equal to the spacing of the successive pictures in each slide, and means for returning the slides from the other end of the exhaust magazine to the other end of the supply magazine.

10. A motion picture machine comprising a supply magazine for holding a stack of motion picture slides in collateral relation, each of said slides being a plurality of pictures long, an exhaust magazine for holding a stack of said motion picture slides in collateral relation, a track connecting one end of the supply magazine with one end of the exhaust magazine, projection means including a driving motor and reciprocable feeding means driven thereby traversing the track, means for intermittently feeding the slides in end to end relation from the supply magazine to the exhaust magazine at motion picture speed, the feeding movement being equal to the spacing of the successive pictures in each slide, and means for returning the slides from the other end of the exhaust magazine to the other end of the supply magazine.

11. A motion picture projector for the projection of pictures which are reinforced by magnetic metallic framing having feed recesses comprising, in combination, feeding means arranged to mechanically engage the feed recesses, and means for constantly magnetically attracting the framing toward the feeding means in order to insure an operative feeding engagement therebetween.

12. A motion picture projector for the projection of film sections which are framed in magnetic metallic frames having feed recesses comprising, in combination, a feeding claw for mechanically engaging the feed recesses of the frames, and means for constantly magnetically attracting the frames transversely toward the claw in order to insure operative feeding engagement therebetween, the magnetic attraction being sufficient to move the frames transversely, but insufficient to prevent the claw from feeding the frames longitudinally.

13. A continuously operable motion picture projector comprising a supply magazine for holding a stack of film frames each a plurality of pictures in length, an exhaust magazine for holding a stack of similar film frames, a track extending between the supply and exhaust magazines, projection means for projecting a picture located in the track at a desired place, means for intermittently feeding the frames from the supply magazine through the track to the exhaust magazine, the feeding movements corresponding to the number of pictures in the frames, means for conveying the frames from the exhaust magazine to a point near the supply magazine, means for transferring the frames into the supply magazine, and means for retaining the frames in the supply magazine.

14. A continuously operable motion picture projector comprising a supply magazine for holding a stack of film frames in superposed relation, an exhaust magazine for holding a stack of film frames in superposed relation, a horizontal track extending between the upper ends of the supply and exhaust magazines, projection means for projecting a picture located in the track at a desired place, means for intermittently feeding the frames in end to end relation from the supply magazine through the track to the exhaust magazine, conveyor means for conveying the frames from the bottom of the exhaust magazine to the bottom of the supply magazine, vertically reciprocable means for raising the slides from the conveyor means into the supply magazine, and means for retaining the slides in the supply magazine.

15. A continuously operable motion picture advertising projector comprising a supply magazine for holding a stack of film frames in superposed relation, an exhaust magazine for holding a stack of film frames in superposed relation, a horizontal track extending between the upper ends of the supply and exhaust magazines, a projection system including a light source, lens system, mirror system, and screen, for projecting a picture located in the track on the screen, means for intermittently feeding the frames in end to end relation from the supply magazine through the track to the exhaust magazine, conveyor means for conveying the frames from the bottom of the exhaust magazine to the bottom of the supply magazine, a vertically reciprocable elevator for raising the slides from the conveyor means into the supply magazine, and holding pawls for retaining the slides in the supply magazine when the elevator descends.

16. A continuously operable motion picture advertising projector comprising a supply magazine for holding a stack of film frames in superposed relation, an exhaust magazine for holding a stack of film frames in superposed relation, a horizontal track extending between the upper ends of the supply and exhaust magazines, a projection system including a light source, lens system, mirror system, and screen, for projecting the image of a picture located in the track on the screen, means including a reciprocable claw for intermittently feeding the frames in end to end relation from the supply magazine through the track to the exhaust magazine, magnetic means for attracting the top frames in the supply magazine upwardly against the claw in order to insure operative feeding engagement therewith, conveyor means for conveying the frames from the bottom of the exhaust magazine to the bottom of the supply magazine, a vertically reciprocable elevator for raising the slides from the conveyor means into the supply magazine, and holding pawls for retaining the slides in the supply magazine when the elevator descends.

17. A continuously operable motion picture projector comprising a supply magazine for holding a supply of film frames in superposed relation, each of said frames being a plurality of pictures long, an exhaust magazine for holding similar film frames in superposed relation, a track extending between the upper ends of the supply and exhaust magazines, projection means for projecting a picture located in the track at a desired place, means for intermittently feeding the frames in end to end relation from the supply magazine through the track to the exhaust magazine, said feed movement being equal to the spacing of the pictures to be successively projected, and means for conveying the frames from the exhaust magazine to the supply magazine.

Signed at New York, in the county of New York and State of New York, this 3rd day of June A. D. 1929.

VAN DYKE HILL.